United States Patent

Horesh (10) Patent No.: US 9,329,684 B2
(45) Date of Patent: May 3, 2016

(54) EYE TRACKING WITH DETECTION OF ADEQUACY OF LIGHTING

(71) Applicant: INTEL CORPORATION, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/293,892

(22) Filed: Jun. 2, 2014

(65) Prior Publication Data

US 2015/0346815 A1     Dec. 3, 2015

(51) Int. Cl.
| | | |
|---|---|---|
| *G06F 3/01* | (2006.01) | |
| *G06F 3/041* | (2006.01) | |
| *G06F 3/044* | (2006.01) | |
| *G06F 3/045* | (2006.01) | |
| *G06F 3/043* | (2006.01) | |
| *G06K 9/00* | (2006.01) | |

(52) U.S. Cl.
CPC .............. *G06F 3/013* (2013.01); *G06F 3/043* (2013.01); *G06F 3/044* (2013.01); *G06F 3/045* (2013.01); *G06F 3/0412* (2013.01); *G06K 9/00604* (2013.01)

(58) Field of Classification Search
CPC .... G06F 3/013; G06F 3/0488; G06K 9/00597
See application file for complete search history.

(56) References Cited

U.S. PATENT DOCUMENTS

| 2009/0296988 A1* | 12/2009 | Yamazaki et al. | ............ 382/103 |
|---|---|---|---|
| 2011/0228975 A1* | 9/2011 | Hennessey et al. | ........... 382/103 |
| 2013/0335546 A1* | 12/2013 | Crane et al. | .................... 348/78 |

OTHER PUBLICATIONS

Horesh, Nizan, "Dynamic Optimization of Light Source Power", International Application No. PCT/US2013/066888, filed Oct. 25, 2013, 38 pages.
Horesh, Nizan, "Dynamic Optimization of Light Source Power", U.S. Appl. No. 14/129,784, filed Dec. 27, 2013, 38 pages.
Horesh, Nizan et al., "Computational Array Camera With Dynamic Illumination for Eye Tracking", U.S. Appl. No. 14/228,371, filed Mar. 28, 2014, 35 pages.

* cited by examiner

*Primary Examiner* — Kent Chang
*Assistant Examiner* — Chayce Bibbee
(74) *Attorney, Agent, or Firm* — Schwabe, Williamson & Wyatt, P.C.

(57) ABSTRACT

Apparatuses, methods and storage media for track an eye of a user are described. In one instance, an apparatus may include an image capturing device to generate a captured image of a user's eye, light sources to illuminate the user's eye, and an eye tracker to track a user's eye that includes identification of intensity of reflection of light off the user's eye, from the captured image of the user's eye, in response to illumination of the user's eye by at least one of the light sources; determination of whether the identified intensity is inadequate, based at least in part on a result of the identification; and taking a corrective action based at least in part on a result of the determination with indication of inadequate intensity. Other embodiments may be described and claimed.

19 Claims, 5 Drawing Sheets

EYE TRACKING WITH DETECTION OF ADEQUACY OF LIGHTING

TECHNICAL FIELD

The present disclosure relates to the field of computing, in particular, to apparatuses, methods and storage media associated with eye tracking that includes detection of adequacy of lighting.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently, some user computing devices, in particular portable devices, may be equipped with additional components aimed at improving user experience, for example eye or gaze tracking systems. Eye tracking systems may be implemented in various applications (e.g., video games, security systems, etc.) to track a user's eye movements and/or the direction in which the user is looking (i.e., the user's gaze direction). Eye tracking systems may use various technologies to track a user's eye movements and/or gaze direction. Many of those technologies rely on light reflected by the person's eye and various relationships between the parts of the eye (e.g., the structure of the eye and the contrast between parts of the eye). In some implementations, eye tracking systems may include an infrared (IR) camera and high-intensity IR light sources that are used to illuminate a user's eye in conjunction with IR sensors that are used to detect the reflections (i.e., glints or Purkinje images) from the user's retina/cornea.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Computing apparatuses, methods and storage media associated with eye tracking that includes automatic detection and adjustment of lighting are described herein. In one instance, an apparatus may include an image capturing device to generate a captured image of a user's eye, light sources to illuminate the user's eye, and an eye tracker to track a user's eye that includes identification of intensity of reflection of light off the user's eye, from the captured image of the user's eye, in response to illumination of the user's eye by at least one of the light sources; determination of whether the identified intensity is inadequate, based at least in part on a result of the identify; and adjustment of one or more of the light sources based at least in part on a result of the determination with indication of inadequate intensity.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
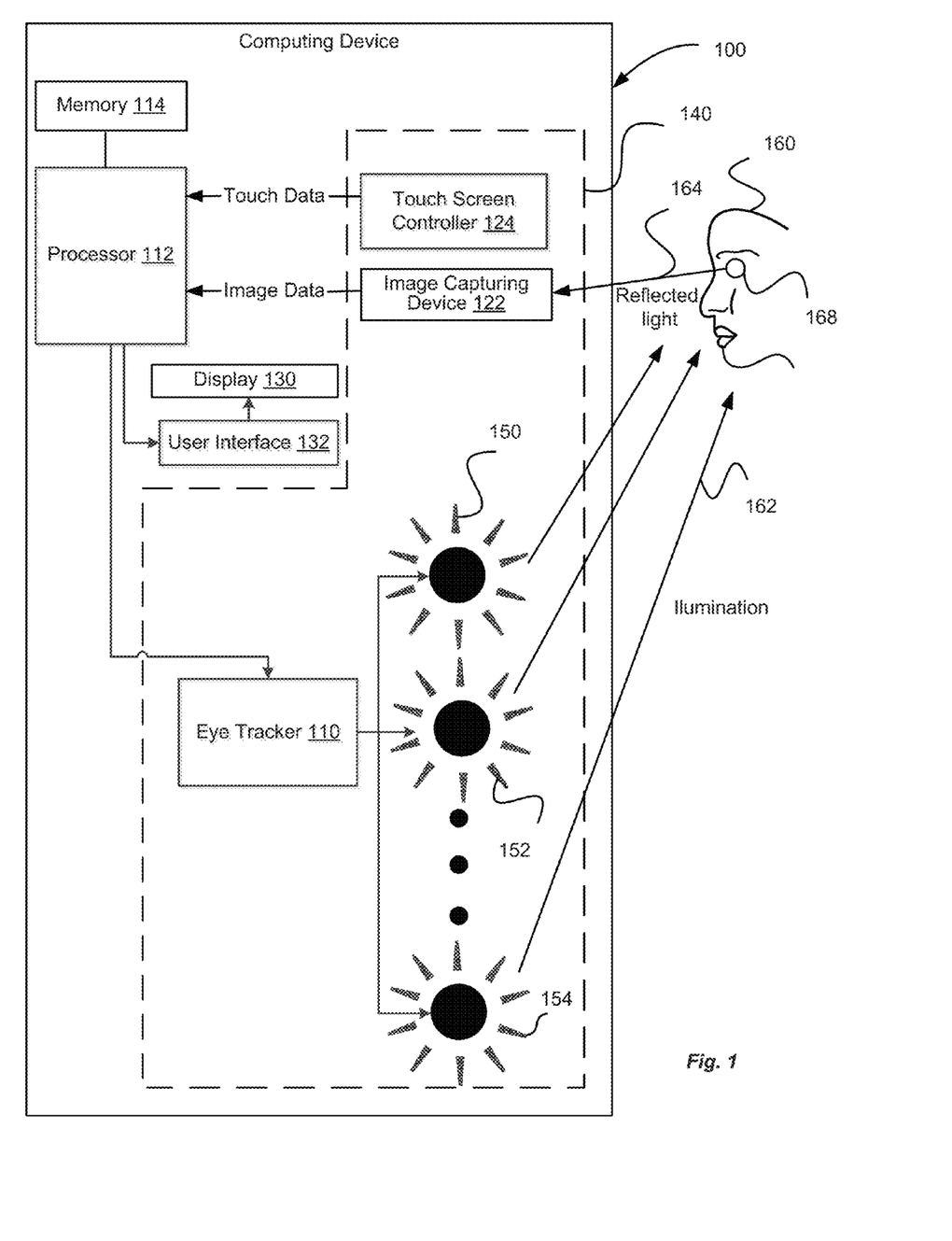
FIG. 1 is a block diagram illustrating an example computing device configured with eye tracking that includes automatic detection and adjustment of lighting, in accordance with various embodiments.

FIG. 1 is a block diagram illustrating an example computing device 100 with eye tracking that includes automated detection and adjustment of lighting, in accordance with various embodiments. As illustrated, the computing device 100 may include a processor 112, a memory 114, a user interface 132, display 130, and eye tracker 110, coupled with each other. In embodiments, display 130 may be a touch screen display with computing device 100 further having touch screen controller 124 selectively coupled with the aforementioned elements. Additionally, computing device 100 may include image capturing device 122. The computing device 100 may be communicatively coupled with light sources 150-154. In some embodiments, the light sources 150, 152, 154 may be separate from and remote to, but communicatively coupled with, the computing device 100. In some embodiments, the light sources 150-154 may be co-located with the computing device 100. For example, the light sources 150-154 may be disposed around the display 130, such as a touch screen display.

Eye tracker 110 may be configured to track user's eye 168, based at least in part on reflected light 164 of illumination 162 provided by light sources 150-154. The precision and accuracy of eye tracking and gaze estimations may be a function of the ability to sufficiently illuminate a user's eye, capture and accurately detect the reflections, and identify various characteristics of the reflections (e.g., intensity of reflected light). During operation, the one or more light sources used for illumination may be obstructed. For example, in an embodiment where the light sources are disposed around the touch screen, the user may inadvertently place her finger on a light source. Under those circumstances, eye tracking and gaze estimation accuracy may thus be negatively affected when the illumination becomes inadequate due to the obstructed light source. Accordingly, eye tracker 110 may be configured to automatically detect and adjust the lighting (or cause the lighting to be adjusted) to improve eye tracking and/or gaze estimation, to be described more fully below.

Continuing to refer to FIG. 1, display 130 may be configured to enable user interface 132 to be rendered thereon. For example, the user interface may render content associated with an application (not shown) on the computing device 100. In some instances, applications executing on the computing device 100 may employ a eye tracker 110 to track a user 160's eye 168, and/or his gaze. The eye tracker 110 may cooperate with at least an image capturing device 122 (e.g., a camera) and one or more light sources 150, 152, 154 (e.g., IR light sources) associated therewith (collectively denoted as 140, and schematically indicated by a dashed line in FIG. 1).

In some embodiments, the eye tracker 110 may be configured to calculate a gaze point of a user 160 for eye tracking, based on reflected light 164 of illumination 162 on user 160 provided by light sources 150, 152, 154. In embodiments, the reflected light 164 may be captured by image capturing device 122. Eye tracker 110 may analyze the captured image to determine a current position of the gaze of the user 160. These operations may be performed in accordance with any one of a wide range of techniques known in the art. Additionally, eye tracker 110 may automatically detect for insufficient illumination (e.g., due to at least partial light obstruction or other factors) and correspondingly adjust the light sources 150, 152, and 154.

The image capturing device 122 may be embodied as any external peripheral (not shown) or integrated device (as illustrated) suitable for capturing images, such as a still camera, a video camera, a webcam, an infrared (IR) camera or other device capable of capturing video and/or images. As discussed, the image capturing device 122 may capture images of a user's eye(s) 168 that are to be tracked. In doing so, the scene captured by the image capturing device 122 may also include other objects (e.g., the user's face or entire body) depending on the particular embodiment. In some embodiments, the image capturing device 122 may be embodied as a three-dimensional (3D) camera, depth camera, or bifocal camera, and/or be otherwise capable of generating a depth image, channel, or stream. In some embodiments, the image capturing device 122 may capture images illuminated by the light sources 150, 152, 154, and provide image data to the processor 112 and/or eye tracker 110 for processing and analysis.

The captured images may be analyzed by eye tracker 110 to determine the light intensity levels of those images, for example, intensity of reflection of light off user's eye(s) 168, from the captured image of the user's eye(s) 168. Although the illustrative computing device 100 includes a single image capturing device 122, it should be appreciated that the computing device 100 may include (or associated with) multiple image capturing devices 122 in other embodiments, which may be used to capture images of the subject's eyes, for example, from different perspectives. The image capturing device 122 may also include one or more imaging sensors, such as infrared sensors, to capture the images. The captured images may be analyzed for eye(s) 168 detection and/or gaze tracking of the user 160 in the field of view of the image capturing device 122.

The light sources 150, 152, 154 may be embodied as any type of light source capable of illuminating an object being tracked by the eye tracker 110 (e.g., the user's eye(s) 168). For example, the light sources 150, 152, 154 may be embodied as infrared light sources configured to project infrared light into the user's eye(s) 168 (e.g., used in conjunction with infrared sensors). The light sources 150, 152, 154 may be configured to illuminate the entire scene (i.e., the area within the field of view of the image capturing device 122) or, in other embodiments, to illuminate only the user's eyes 168 or some portion of the scene. The light (e.g., infrared light) transmitted from the light sources 150, 152, 154 may be reflected off the user's eye(s) 168 and captured by the image capturing device 122 for image analysis (e.g., glint analysis). The light sources 150, 152, 154 may be integrated with computing device 100 as shown, or in alternate embodiments, externally disposed.

The eye tracker 110 may cooperate with other additional components, such as those commonly found in a computing device (e.g., various input/output devices), in other embodiments. In some embodiments, the eye tracker 110 may predict the location of the user's eyes at a future time (e.g., the next captured frame) instead of using the current location of the user's eyes for analyses.

For example, the computing device 100 may include one or more sensors, which may include any number and type of sensors depending on, for example, the type and/or intended use of the computing device 100. The sensors may include, for example, proximity sensors, inertial sensors, optical sensors, light sensors, audio sensors, temperature sensors, thermistors, motion sensors, and/or other types of sensors. The eye tracker 110 may also cooperate with these components and/or devices configured to facilitate the use of the sensors.

Additionally, in some embodiments, one or more of the illustrative components may be incorporated in, or otherwise form a portion of, another component. For example, the memory 114, or portions thereof, may be incorporated in the processor 112 in some embodiments. In some embodiments, the processor 112 and/or memory 114 of the computing device 100 may be configured to process data provided by the eye tracker 110. It should be appreciated that, in some embodiments, any or all of the illustrated components, such as the image capturing device 122 and/or the light sources 150, 152, 154 may be separate from and remote to, but communicatively coupled with, the computing device 100. In general, some or all of the functionalities of the computing device 100, such as processing power and/or memory capacity may be used or shared with the eye tracker 110.

In some embodiments, the eye tracker 110 may be configured to detect inadequate intensity of reflected light, determine a cause of the inadequate intensity (e.g., a partial or complete light source obstruction), and initiate a corresponding corrective action, such as activate an additional light source, alert the user, deactivate the obstructed light source, and the like. The eye tracker 110 may comprise hardware, software, firmware, or a combination thereof and may be configured to execute, or cause the processor 112 to execute, instructions to identify the intensity of reflection of light off the user's eye(s) 168 (e.g., a glint), from a captured image of the user's eye(s) 168, in response to illumination of the user's eye(s) 168 by at least one of one or more light sources 150, 152, 154, determine whether the intensity is adequate, and initiate a corrective action or actions based on a result of the determination. Hardware embodiments of eye tracker 110 may be implemented via an application specific integrated circuit (ASIC), or a programmable circuit, such as a field programmable gate array (FPGA), programmed with the logic of the eye tracker 110 described herein.

To identify reflected light intensity, the eye tracker 110 may detect the existence of one or more glints in the captured image and identify a region of the captured image corresponding with each of the detected glints (i.e., a glint region). The glint intensity of a particular glint may be defined as the maximum intensity of pixels of the captured image corresponding to the glint region of that particular glint. In other embodiments, the glint intensity may be calculated or otherwise determined using other suitable techniques or algorithms. For example, the glint intensity may be defined as the average intensity of pixels in the glint region.

In some embodiments, the eye tracker 110 may be configured to determine whether the identified light reflection intensity is adequate, based on a result of the identified intensity. For example, the eye tracker 110 may obtain (e.g., calculate or estimate) an expected intensity of reflection of light off the user's eye(s) 168, based at least in part on one or more characteristics associated with the computing device 100. More specifically, the expected intensity may be calculated based on one or more of: optical power characteristics of the light sources 150, 152, 154, environmental conditions, geometric properties associated with the light projected by the light sources 150, 152, 154, or optical characteristics of the image capturing device 122.

For example, the computation of the expected light reflection intensity may be based on the following components. The optical path, e.g., the path from each one of light sources or one of the light sources 150, 152, 154, to the user's eye(s) 168 and then to the image capturing device 122 may be determined. Estimating the distance to the eye(s) 168 may be provided as a part of an eye tracking algorithm used to track the user's eye(s). The location of the light sources 150, 152, 154 and the image capturing device 122 on the computing device 100 is also known (see description below in reference to FIG. 2). Accordingly, the optical path may be determined or estimated.

The light sources 150, 152, 154 may have known optical power characteristics: for example, the optical power of the light sources may be determined given the electrical current that is driving the optical power. Furthermore, the light sources 150, 152, 154 may have known geometric properties. For example, the power density emitted by the light source may be known or estimated. Furthermore, the image capturing device 122 properties, such as lens characteristics, camera settings, filter characteristics, and corresponding effects, such as vignetting, may also be known and/or estimated.

In some embodiments, the eye tracker 110, through additional sensors, may be configured to determine external conditions, such as ambient light conditions (e.g., ambient light brightness, light intensity, and the like) associated with the computing device 100. The determined ambient light conditions may affect the calculation of the expected intensity of reflected light. For example, brighter ambient light may result in a higher expected intensity of reflected light. In some embodiments, the photographic conditions, e.g., exposure time, illumination power, sensor gain, and the like, may be factors in calculating the expected intensity of reflected light. In summary, the expected intensity of reflected light may be estimated or calculated based on some or all of the above-described parameters. The expected intensity may be calculated dynamically (e.g., at each image capturing) or be calculated in advance, based on at least some of the above-described characteristics.

The eye tracker 110 may be configured to compare the intensity of reflected light identified from the captured image and the expected light intensity and determine whether the identified intensity of reflected light is adequate for eye tracking purposes. For example, the eye tracker 110 may determine whether the identified intensity is lower than the expected intensity of reflection of light by at least a predetermined threshold value. If the identified intensity is determined to be inadequate, the eye tracker 110 may initiate a corrective action. A corrective action may include, for example, deactivating a light source, turning on an additional light source, alerting the user that the light intensity is inadequate, and the like.

Insufficient or inadequate illumination, resulting in inadequate reflected light intensity, may be caused by a number of reasons. For example, the user 160 may move away from the display 130, or move laterally, at least partially or completely away from the field of view of the image capturing device 122. In another example, the user 160 may partially or fully obstruct (e.g., inadvertently) one or more of the light sources 150, 152, 154. In some embodiments, the eye tracker 110 may be configured to determine (with a desired probability) whether the inadequate light intensity may have been caused by at least a partial light source obstruction. Such determination may be based on a combination of two events: a detection of a user input (e.g., touch) in an area of the computing device screen proximate to a location of a light source and identification of inadequacy of the reflected light intensity. The description of the determination of at least a partial light source obstruction based on a touch event and inadequate reflected light intensity is provided below with reference to FIGS. 2 and 3.

Figure 2:
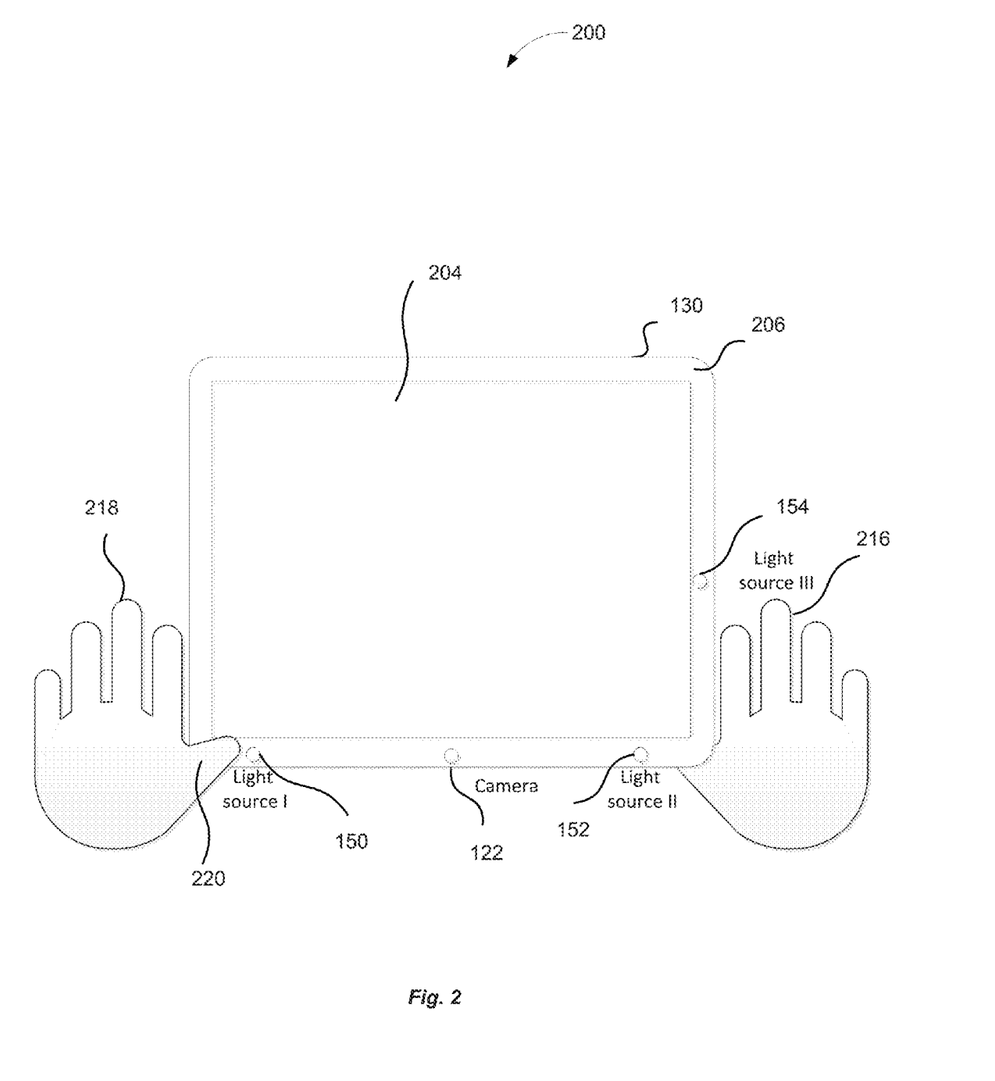
FIG. 2 illustrates an example front view of the computing device of FIG. 1, in accordance with some embodiments.

FIG. 2 illustrates an example front view 200 of an illustrative computing device, such as the computing device 100, in accordance with some embodiments. The front view 200 of the computing device 100 may include the display 130 with a touch screen 204 disposed within a bezel 206. The computing device 100 may further include one or more light sources 150, 152, 154 and the image capturing device 122 disposed substantially around the touch screen 204. In some embodiments, the lights sources 150, 152, 154, and image capturing device 122 may be disposed on the bezel 206, as shown. It will be appreciated that three lights sources 150, 152, 154 are shown in FIGS. 1 and 2 for illustrative purposes only, and do not limit the number of lights sources to this number.

In general, a number and placement of light sources 150, 152, 154 on the computing device 100 may vary, depending on technological considerations associated with the computing device 100, such as componentry costs, power consumption, availability of real estate to dispose the light sources, and the like. Similarly, a number of the image capturing devices such as device 122 and their placement on the computing device 100 may vary, depending on technological considerations associated with the computing device 100. For example, one or two light sources may be used in the eye tracking system 140 (e.g. light sources 150, 152). In some embodiments, additional light sources (e.g., 154) may be used in a corrective action initiated by the light source adjustment module, for example to compensate for insufficient or inadequate illumination of the user 160, resulting in inadequate intensity of light reflected off the user's eye(s) 168.

As illustrated in FIG. 2, the user 160 may hold the computing device 100 at the bezel 206 with her hands 216, 218. In some instances, a position of a hand of the user may change such as to partially or completely obstruct the light source. As shown in FIG. 2, the thumb 220 of the user's hand 218 may hold the bezel 206 and/or the screen 204 in an area proximate to the light source 150. Thus, the hand 218 may inadvertently obstruct the light source 150. Accordingly, illumination provided by the light sources 150, 152, 154 may be inadequate, resulting in inadequate intensity of light reflected off the user's eye(s) 168.

Figure 3:
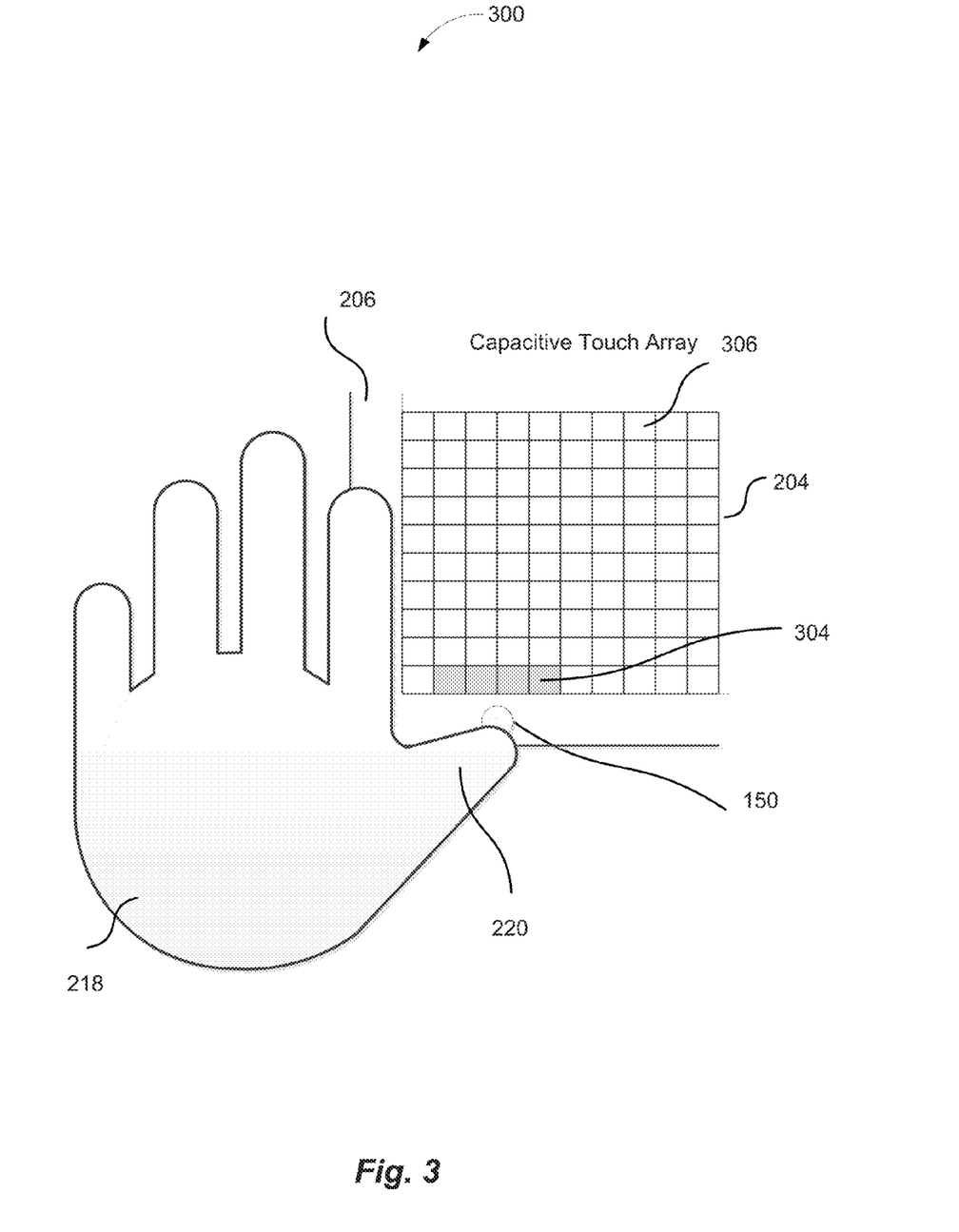
FIG. 3 illustrates an example partial front view of the computing device of FIG. 1, in accordance with some embodiments.

FIG. 3 illustrates an example partial front view 300 of the computing device 100, in accordance with some embodiments. More specifically, the partial front view 300 includes a lower left portion of the front view 200 of the computing device 100, including a portion of the bezel 206, a portion of the screen 204, a light source 150, and the user's hand 218. As shown, the thumb 220 may be placed such as to at least partially obstruct the light source 150. The thumb 220 may (e.g., inadvertently) touch an area 304 (marked in darker shade) of the touch screen 204 that is proximate the location of the light source 150. The touch screen 204 may comprise a grid array (e.g., capacitive touch array) 306.

In some embodiments, the computing device 100 may be configured to detect a touch event associated with user input on the screen of the display 130 (comprising a touch screen) of the computing device 100. The computing device 100 may further detect, using conventional touch sensing technologies (e.g., built into an operating system of the computing device 100) a touch event proximate to the at least one of the one or more light sources 150, 152, 154. In addition or in the alternative, referencing FIG. 1, the computing device 100 may include a touch screen controller 124 aimed at detecting touch events, including those that may not be detected via conventional techniques. For example, a touch may be faint enough not to be detected by conventional touch sensing techniques. However, the touch screen controller 124 may be configured to detect a change (however slight) in resistive, capacitive, or acoustic characteristics associated with the area of the screen, depending on a type of the touch screen used with the computing device 100. For example, the touch screen controller 124 may be configured to sense capacitance (resistance, acoustic wave) change below a certain threshold.

For example, the touch screen controller 124 may be tuned to sense capacitance change of the area 304 that may not be detected by the touch sensing technique associated with the operating system of the computing device 100. In some embodiments, the touch screen controller 124 may be connected to the grid array 306 of the touch screen 204 and may detect faint touches of the screen 204 by sensing the change in capacitance (resistance, acoustic wave characteristics, or the like) that ordinarily may not be detected or identified as touch events. The touch screen controller 124 may provide the touch event data to the processor 112 and/or eye tracker 110 for further processing.

A detection of a touch event in the area proximate to a light source and a determination that the identified intensity of reflected light is inadequate may lead to a conclusion, with a probability that is equal or above a determined value, that the cause of the inadequate reflected light intensity is at least partial obstruction of the light source. To remedy the determined light source obstruction, the eye tracker 110 may initiate a corrective action, including, but not limited to, at least one of the following: deactivate the obstructed light source, activate another light source (if available) to compensate for the obstruction, and/or generate an alert (e.g., displayed to the user) to indicate the inadequate intensity of reflected light.

Figure 4:
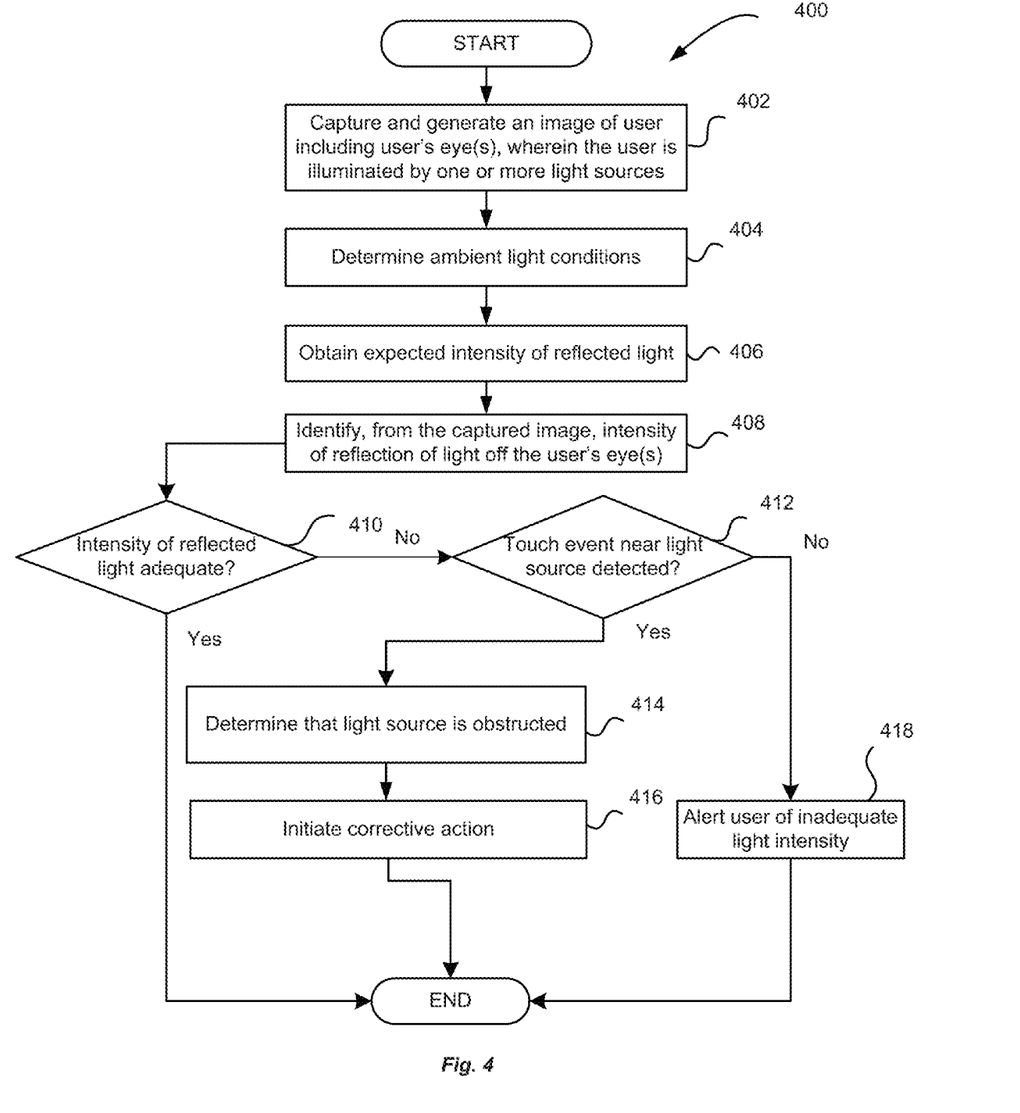
FIG. 4 is an example process flow diagram illustrating a process for eye tracking that includes automatic detecting and adjustment of lighting, in accordance with some embodiments.

FIG. 4 illustrates a process 400 for eye tracking that includes automatic detecting and adjustment of lighting, in accordance with some embodiments. The process 400 may be performed, for example, by the computing device 100 configured with an eye tracker 110 described in reference to FIG. 1.

The process 400 may begin at block 402, where an image of the user 160 (e.g., at least a portion of the user that includes the user's eye(s) 168) may be captured, e.g., with the image capturing device 122. As described above, the user 160 may be illuminated by at least one of the one or more light sources 150, 152, 154 disposed around a touch screen of the computing device, to facilitate image capturing and eye tracking analysis of the captured image.

At block 404, environmental conditions, such as ambient light conditions associated with the device 100, such as the brightness of ambient light, may be determined. For example, the computing device 100 may include a sensor configured to detect the ambient light conditions, and determine and provide data corresponding to the determined ambient light conditions to the eye tracker 110.

At block 406, an expected intensity of light reflected off the user's eye(s) 168 may be calculated, estimated or retrieved, e.g., by eye tracker 110. As described above, the expected intensity may be calculated dynamically or pre-calculated in advance based at least in part on various characteristics associated with the computing device 100 and/or determined environmental conditions. The expected intensity may be stored, e.g., in memory 114 of the computing device 100.

At block 408, the intensity of reflection of light off the user's eye(s) 168, in response to illumination of the user's eye(s) may be identified from the captured image of the user's eye(s) 168, e.g., by eye tracker 110.

At decision block 410, a determination may be made on whether the identified intensity of reflection is adequate, e.g., by eye tracker 110. For example, the eye tracker 110 may compare the identified intensity with the expected intensity. If the identified intensity is determined to be within a threshold value relative to the expected intensity, the identified intensity may be determined to be adequate, and the process 400 may end. If the identified intensity is determined to be below the expected intensity by at least the threshold, the identified intensity may be determined to be inadequate.

If the identified intensity is determined to be inadequate, the process 400 may move to decision block 412. At decision block 412, a determination on whether a touch event occurred in an area of the touch screen 204 proximate to one of the light sources 150, 152, 154 may be made, e.g., by eye tracker 110. For example, the touch screen controller 124 may detect such event as described above and report the event to the eye tracker 110.

If the touch event near any of the light sources is not detected, the process 400 may move to block 418. At block 418, an alert may be provided to the user with respect to the light intensity being inadequate, e.g., by eye tracker 110. As described above, a variety of reasons may cause, or contribute to, inadequacy of the light intensity. For example, the user may move away or sideways from the computing device 100, causing the illumination to be insufficient. In another example, the light source(s) may be at least partially obstructed.

If the touch event near any of the light sources is detected, the process 400 may move to block 414. At block 414, a determination (with a desired level of probability), based on a combination of determinations made in blocks 410 and 412, with respect to whether the light source near which the touch event has been obstructed, may be made, e.g., by eye tracker 110.

At block 416, a corrective action as described above, e.g., deactivate the obstructed light source, activate another light source (if available), alert the user, or any combination thereof, may be initiated, e.g., by eye tracker system 140.

Figure 5:
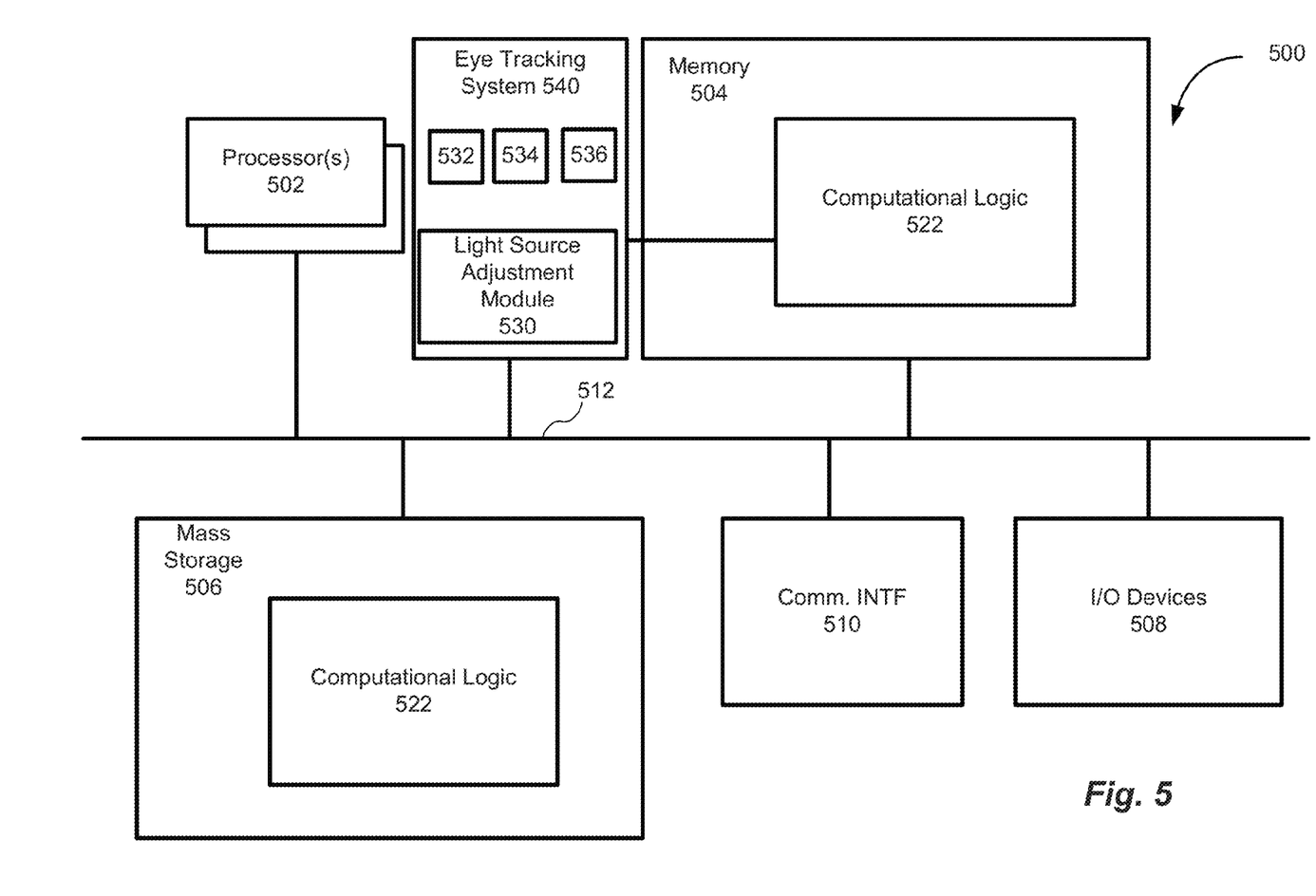
FIG. 5 illustrates an example computing environment suitable for practicing various aspects of the disclosure, in accordance with various embodiments.

FIG. 5 illustrates an example computing device 500 suitable for use to practice aspects of the present disclosure, in accordance with various embodiments. As shown, computing device 500 may include one or more processors or processor cores 502, and system memory 504. For the purpose of this application, including the claims, the terms "processor" and "processor cores" may be considered synonymous, unless the context clearly requires otherwise. The processor 502 may include any type of processors, such as a central processing unit (CPU), a microprocessor, and the like. The processor 502 may be implemented as an integrated circuit having multi-cores, e.g., a multi-core microprocessor. The computing device 500 may include mass storage devices 506 (such as diskette, hard drive, volatile memory (e.g., DRAM), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 500 may further include input/output (I/O) devices 508 (such as a display (e.g., touchscreen display similar to 130), keyboard, cursor control, remote control, gaming controller, image capture device, and so forth) and communication interfaces (comm. INTF) 510 (such as network interface cards, modems, infrared receivers, radio receivers (e.g., Bluetooth), and so forth).

The communication interfaces 510 may include communication chips (not shown) that may be configured to operate the device 500 (or 100) in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations associated with computing device 100, e.g., operations associated with the image capturing device 122, touch screen controller 124, and eye tracker 110, as described in reference to FIG. 4. The various elements may be implemented by assembler instructions supported by processor(s) 502 or high-level languages that may be compiled into such instructions.

The permanent copy of the programming instructions may be placed into mass storage devices 506 in the factory, or in the field, through, for example, a distribution medium (not shown), such as a compact disc (CD), or through communication interfaces 510 (from a distribution server (not shown)).

The number, capability and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 502 may be packaged together with computational logic 522 configured to practice aspects of embodiments described in reference to FIGS. 1-4. For one embodiment, at least one of the processors 502 may be packaged together with computational logic 522 configured to practice aspects of process 400 of FIG. 4 to form a System in Package (SiP) or a System on Chip (SoC). For at least one embodiment, the SoC may be utilized in, e.g., but not limited to, a mobile computing device such as a computing tablet or smartphone. For example, computational logic 522 may be associated with, or otherwise configured to include or access, eye tracking system 540, and in particular light source adjustment module 530 similar to the eye tracker 110 of the eye tracking system 140. Similarly to the eye tracking system 140, the eye tracking system 540 may include other components, such as light source(s) 532, image capturing device(s) 534, and touch screen controller 536, as well as other components configured to provide eye tracking capabilities described in reference to FIG. 1.

In various implementations, the computing device 500 may comprise a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

The following paragraphs describe examples of various embodiments. Example 1 is at least one non-transitory computer-readable medium comprising executable instructions that, in response to execution of the instructions by a computing device, cause the computing device to track an eye of a user of the computing device, which includes the computing device caused to identify intensity of reflection of light off the user's eye, from a captured image of the user's eye, in response to illumination of the user's eye by at least one of one or more light sources; determine whether the identified intensity is inadequate, based at least in part on a result of the identify; and initiate a corrective action to improve tracking of the user's eye, based at least in part on a result of the determine with indication of inadequate intensity.

Example 2 may include the subject matter of Example 1, and further specifies that to determine whether the identified intensity is inadequate includes: to calculate an expected intensity of reflection of light, based at least in part on one or more characteristics associated with the computing device; and to determine whether the identified intensity is lower than the expected intensity of reflection of light by at least a threshold.

Example 3 may include the subject matter of Example 2, and further specifies that to calculate the expected intensity is based on at least one of: optical power characteristics of the light sources, environmental conditions, geometric properties associated with the light projected by the light sources, or optical characteristics of an image capturing device associated with the computing device.

Example 4 may include the subject matter of Example 2, and further specifies that the one or more light sources are disposed around a touch screen of the computing device, and wherein to determine further includes to detect a touch event in an area of the touch screen of the computing device proximate to the at least one of the one or more light sources.

Example 5 may include the subject matter of Example 4, and further specifies that to detect includes to determine a change in resistive, capacitive, or acoustic characteristics associated with the area of the touch screen.

Example 6 may include the subject matter of Example 4, and further specifies that the instructions, in response to execution by the computing device, further cause the computing device to determine that the at least one of the light sources is obstructed, based on the determine that the identified intensity is lower than an expected intensity of reflection of light by at least a threshold.

Example 7 may include the subject matter of Example 6, and further specifies that the instructions that cause the computing device to initiate a corrective action based at least in part on a result of the determine further cause the computing device to: deactivate the obstructed light source; and activate another one of the light sources, to compensate for the obstruction.

Example 8 may include the subject matter of Example 1, and further specifies that the instructions, in response to execution of the instructions by the computing device, further cause the computing device to: capture the image of the user's eye, with an image capturing device associated with the computing device.

Example 9 may include the subject matter of any of Examples 1 to 8, and further specifies that to initiate a corrective action includes to generate an alert to indicate the inadequate intensity of reflected light.

Example 10 is apparatus having an eye tracking feature, comprising: an image capturing device to generate a captured image of a user's eye and an eye tracker coupled with the image capturing device and one or more light sources to track a user's eye, wherein to track the user's eye includes: identify intensity of reflection of light off the user's eye, from the captured image of the user's eye, in response to illumination of the user's eye by at least one of the one or more light sources; determine whether the identified intensity is inadequate, based at least in part on a result of the identify; and initiate a corrective action to improve tracking of the user's eye, based at least in part on a result of the determine with indication of inadequate intensity.

Example 11 may include the subject matter of Example 10, and further specifies that the eye tracker is to determine whether the identified intensity is inadequate through determination of whether the identified intensity is lower than an expected intensity of reflection of light by at least a threshold, wherein the expected intensity is calculated based at least in part on one or more characteristics associated with the apparatus.

Example 12 may include the subject matter of Example 10, and further specifies that to initiate the corrective action includes to generate an alert to indicate the inadequate intensity of reflected light.

Example 13 may include the subject matter of Example 10, and further specifies that the one or more light sources are co-located with the apparatus.

Example 14 may include the subject matter of Example 13, and further specifies that the apparatus may comprise a touch screen, wherein the one or more light sources are disposed on a bezel around the touch screen.

Example 15 may include the subject matter of Example 14, and further specifies that the apparatus may comprise a touch screen controller coupled to the touch screen to detect user touching of the touch screen.

Example 16 may include the subject matter of Example 15, and further specifies that the eye tracker is further coupled with the touch screen controller to detect a touch event in an area of the touch screen proximate to the at least one of the one or more light sources.

Example 17 may include the subject matter of Example 16, and further specifies that the eye tracker is to determine that the at least one of the light sources is obstructed, based on the determination that the identified intensity is lower than the expected intensity by the at least a threshold, and on the detection of the touch event in the area of the screen proximate to the at least one of the one or more light sources.

Example 18 may include the subject matter of Example 17, and further specifies that the eye tracker to initiate the corrective action through deactivation of the obstructed light source or activation an additional one of the light sources, to compensate for the obstruction.

Example 19 may include the subject matter of any of Examples 13 to 18, and further specifies that the apparatus is a tablet computing device, wherein the light sources comprise at least two infrared (IR) light sources, and wherein the image capturing device comprises an IR camera.

Example 20 is computer-implemented method for tracking a user's eye, comprising: identifying, by a computing device, intensity of reflection of light off the user's eye, from a captured image of the user's eye, in response to illumination of the user's eye by at least one of one or more light sources; determining, by the computing device, whether the identified intensity is inadequate, based at least in part on a result of the identifying; and initiating, by the computing device, a corrective action to improve tracking of the user's eye based at least in part on a result of the determining with indication of inadequate intensity.

Example 21 may include the subject matter of Example 20, and further specifies that the determining includes calculating, by the computing device, an expected intensity of reflection of light, based at least in part on one or more characteristics associated with the computing device; and determining, by the computing device, whether the identified intensity is lower than the calculated expected intensity of reflection of light by at least a threshold.

Example 22 may include the subject matter of Example 21, and further specifies that the calculating the expected intensity is further based on at least one of: optical power characteristics of the light sources, environmental conditions, geometric properties associated with the light projected by the light sources, or optical characteristics of the image capturing device associated with the computing device.

Example 23 may include the subject matter of Example 22, and further specifies that the method further comprises detecting, by the computing device, a touch event in an area of a touch screen of the computing device proximate to at least one of the one or more light sources, the one or more light sources being disposed around the touch screen.

Example 24 may include the subject matter of Example 23, and further specifies that the method further comprises determining, by the computing device, that the at least one of the light sources is obstructed, wherein the identified intensity is determined to be lower than the expected intensity by the threshold.

Example 25 may include the subject matter of Example 20, and further specifies that the initiating the corrective action includes: generating, by the computing device, an alert to indicate the result of the determining.

Example 26 may include the subject matter of any of Examples 20 to 25, and further specifies that the method further comprises capturing, by the computing device, the image of the user's eye, with an image capturing device.

Example 27 is an apparatus for tracking a user's eye, comprising: means for identifying intensity of reflection of light off the user's eye, from a captured image of the user's eye, in response to illumination of the user's eye by at least one of one or more light sources; means for determining whether the identified intensity is inadequate, based at least in part on a result of the identifying; and means for initiating a corrective action to improve tracking of the user's eye, based at least in part on a result of the determining with indication of inadequate intensity.

Example 28 may include the subject matter of Example 27, and further specifies that the means for determining include: means for calculating an expected intensity of reflection of light, based at least in part on one or more characteristics associated with the computing device; and means for determining whether the identified intensity is lower than the expected intensity of reflection of light by at least a threshold.

Example 29 may include the subject matter of Example 28, and further specifies that the calculating of the expected intensity is based on at least one of: optical power characteristics of the light sources, environmental conditions, geometric properties associated with the light projected by the light sources, or optical characteristics of an image capturing device associated with the computing device.

Example 30 may include the subject matter of Example 28, and further specifies that the one or more light sources are disposed around a touch screen of the apparatus, and wherein the means for determining further includes means for detecting a touch event in an area of the touch screen of the apparatus proximate to the at least one of the one or more light sources.

Example 31 may include the subject matter of Example 30, and further specifies that the means for detecting includes means for determining a change in resistive, capacitive, or acoustic characteristics associated with the area of the touch screen.

Example 32 may include the subject matter of Example 30, and further specifies that the apparatus includes means for determining that the at least one of the light sources is obstructed, based on the determining that the identified intensity is lower than an expected intensity of reflection of light by at least a threshold.

Example 33 may include the subject matter of any of Examples 27 to 32, and further specifies that the apparatus includes means for capturing the image of the user's eye, with an image capturing device associated with the apparatus.

Example 34 may include the subject matter of any of Examples 27 to 32, and further specifies that the means for initiating a corrective action includes means for generating an alert to indicate the inadequate intensity of reflected light.

Computer-readable media (including non-transitory computer-readable media), methods, apparatuses, systems, and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. At least one non-transitory computer-readable medium comprising executable instructions that, in response to execution of the instructions by a computing device, cause the computing device to track an eye of a user of the computing device, which includes the computing device caused to:
   identify intensity of reflection of light off the user's eye, from a captured image of the user's eye, in response to illumination of the user's eye by at least one of one or more light sources;
   determine that the identified intensity is lower than an expected intensity of reflection of light by at least a threshold;
   detect a touch event in an area of a touch screen of the computing device proximate to the at least one of the one or more light sources, wherein the one or more light sources are disposed around the touch screen of the computing device;
   establish that the at least one of the light sources is obstructed, based on the determination that the identified intensity is lower than an expected intensity of reflection of light by at least a threshold and on the detection of a touch event in the area of the touch screen proximate to the at least one of the one or more light sources; and
   initiate a corrective action to improve tracking of the user's eye, based at least in part on a result of the determine, wherein to initiate a corrective action includes to activate another one of the light sources, to compensate for the lower than expected intensity of the at least one of the one or more light sources.

2. The at least one non-transitory computer-readable medium of claim 1, wherein the instructions further cause the computing device to calculate the expected intensity of reflection of light, based at least in part on one or more characteristics associated with the computing device.

3. The at least one non-transitory computer-readable medium of claim 2, wherein to calculate the expected intensity is based on at least one of: optical power characteristics of the light sources, environmental conditions, geometric properties associated with the light projected by the light sources, or optical characteristics of an image capturing device associated with the computing device.

4. The at least one non-transitory computer-readable medium of claim 1, wherein to detect a touch event includes to determine a change in resistive, capacitive, or acoustic characteristics associated with the area of the touch screen.

5. The at least one non-transitory computer-readable medium of claim 2, wherein the instructions that cause the computing device to initiate a corrective action based at least in part on a result of the determine further cause the computing device to: deactivate the obstructed light source.

6. The at least one non-transitory computer-readable medium of claim 1, wherein the instructions, in response to execution of the instructions by the computing device, further cause the computing device to: capture the image of the user's eye, with an image capturing device associated with the computing device.

7. The at least one non-transitory computer-readable medium of claim 1, wherein to initiate a corrective action further includes to generate an alert to indicate the inadequate intensity of reflected light.

8. An apparatus having an eye tracking feature, comprising:
an image capturing device to generate a captured image of a user's eye; and
an eye tracker coupled with the image capturing device and one or more light sources to track the user's eye, wherein to track the user's eye is to:
identify intensity of reflection of light off the user's eye, from the captured image of the user's eye, in response to illumination of the user's eye by at least one of the one or more light sources;
determine that the identified intensity is lower than an expected intensity of reflection of light by at least a threshold;
detect a touch event in an area of a touch screen of the computing device proximate to the at least one of the one or more light sources, wherein the one or more light sources are disposed around the touch screen of the computing device;
establish that the at least one of the light sources is obstructed, based on the determination that the identified intensity is lower than an expected intensity of reflection of light by at least a threshold and on the detection of a touch event in the area of the touch screen proximate to the at least one of the one or more light sources; and
initiate a corrective action to improve tracking of the user's eye, based at least in part on a result of the determination, wherein to initiate a corrective action includes to activate another one of the light sources, to compensate for the lower than expected intensity of the at least one of the one or more light sources.

9. The apparatus of claim 8, wherein the eye tracker is to calculate the expected intensity based at least in part on one or more characteristics associated with the apparatus.

10. The apparatus of claim 8, wherein to initiate the corrective action further includes to generate an alert to indicate the inadequate intensity of reflected light.

11. The apparatus of claim 8, wherein the one or more light sources are co-located with the apparatus.

12. The apparatus of claim 11, wherein the one or more light sources are disposed on a bezel around the touch screen.

13. The apparatus of claim 12, further comprising a touch screen controller coupled to the eye tracker and the touch screen to detect a touch event in an area of the touch screen proximate to the at least one of the one or more light sources.

14. The apparatus of claim 13, wherein the eye tracker to initiate the corrective action through:
deactivation of the obstructed light source.

15. The apparatus of claim 14, wherein the apparatus is a tablet computing device, wherein the light sources comprise at least two infrared (IR) light sources, and wherein the image capturing device comprises an IR camera.

16. A computer-implemented method for tracking a user's eye, comprising:
identifying, by a computing device, intensity of reflection of light off the user's eye, from a captured image of the user's eye, in response to illumination of the user's eye by at least one of one or more light sources;
determining, by the computing device, that the identified intensity is lower than an expected intensity of reflection of light by at least a threshold;
detecting, by the computing device, a touch event in an area of a touch screen of the computing device proximate to the at least one of the one or more light sources, wherein the one or more light sources are disposed around the touch screen of the computing device;
determining, by the computing device, that the at least one of the light sources is obstructed, based on the determination that the identified intensity is lower than an expected intensity of reflection of light by at least a threshold and on the detection of a touch event in the area of the touch screen proximate to the at least one of the one or more light sources; and
initiating, by the computing device, a corrective action to improve tracking of the user's eye based at least in part on a result of the determining that the light source is obstructed, wherein the initiating a corrective action includes deactivating the obstructed light source.

17. The computer-implemented method of claim 16, wherein the determining includes:
calculating, by the computing device, the expected intensity of reflection of light, based at least in part on one or more characteristics associated with the computing device.

18. The computer-implemented method of claim 17, wherein the calculating the expected intensity is further based on at least one of: optical power characteristics of the light sources, environmental conditions, geometric properties associated with the light projected by the light sources, or optical characteristics of the image capturing device associated with the computing device.

19. The computer-implemented method of claim 16, wherein the initiating the corrective action further includes:
generating, by the computing device, an alert to indicate the result of the determining that the at least one of the one or more light sources is obstructed.

* * * * *